United States Patent
Pike et al.

[19]

[11] Patent Number: 6,021,660
[45] Date of Patent: Feb. 8, 2000

[54] FLEXIBLE FIXTURE FOR LOCATING DIFFERENT TYPES OF MASS AIR FLOW SENSOR ASSEMBLIES

[75] Inventors: Christopher Winthrup Pike, West Bloomfield, Mich.; Thomas Richard Trafford, North Wales, Pa.

[73] Assignee: Ford Motor Company, Dearborn, Mich.

[21] Appl. No.: 08/929,447

[22] Filed: Sep. 15, 1997

[51] Int. Cl.[7] .................................................. G01F 25/00
[52] U.S. Cl. .............................. 73/1.35; 73/198; 73/201; 29/799
[58] Field of Search .................................... 73/1.16, 1.34, 73/1.35, 118.2, 198, 201; 248/542, 346.03, 904, 183.1, 146, 149, 176.1, 682; 29/742, 754, 772, 791, 799; 364/468.21; 33/533, 644, 645, 567, 570, 573

[56] References Cited

U.S. PATENT DOCUMENTS

| | | | |
|---|---|---|---|
| 4,177,676 | 12/1979 | Welker | 73/198 |
| 4,345,464 | 8/1982 | Herzl et al. | 73/201 |
| 4,693,370 | 9/1987 | Aceti | 29/799 X |
| 4,823,462 | 4/1989 | Huber | 73/118.2 |
| 4,986,123 | 1/1991 | Lösing et al. | 73/118.2 X |
| 5,201,221 | 4/1993 | Forgacs et al. | 73/204.26 |
| 5,228,338 | 7/1993 | Saghatchi | 73/201 |
| 5,231,898 | 8/1993 | Zanini-Fisher et al. | 73/204.26 |
| 5,400,639 | 3/1995 | Caron et al. | |
| 5,461,911 | 10/1995 | Eriksson et al. | 73/201 |
| 5,768,768 | 6/1998 | Best | 29/799 X |

*Primary Examiner*—Thomas P. Noland
*Attorney, Agent, or Firm*—Joseph W. Malleck

[57] ABSTRACT

A flexible tooling fixture that has a pallet bed lying within an x-y plane and reference elements for alignment of the bed to the manufacturing tool; and at least two sets of supports extending from the top of the pallet bed, each set consisting of: (i) a flexible pivot to accurately locate differing brackets of the sensor assemblies to maintain the axis of the barrel in a common z-x plane, the z-x plane being off-set from the center of the bed, and (ii) one or more fixed stops for engaging the barrel and bracket of each assembly to determine a common-x-y position for each sensor module with the axis of the barrel in a predetermined relation to the bed, one set of supports being located to determine alignment of the axes of one class of sensor assemblies within the predetermined position, and the other set being located to determine alignment of the axes of another class of sensor assemblies within the same predetermined z-x plane when the bed is in a second position that is 180° rotated from the first position.

10 Claims, 8 Drawing Sheets

FLEXIBLE FIXTURE FOR LOCATING DIFFERENT TYPES OF MASS AIR FLOW SENSOR ASSEMBLIES

TECHNICAL FIELD

The invention is related to carriers which support devices on production lines and in particular to a carrier for the assembly, test and calibration of mass air flow sensors on a production line.

DISCUSSION OF THE PRIOR ART

Mass air flow sensor assemblies typically comprise an air flow manifold (barrel), an electronic box containing a sensor circuit that is mounted on the manifold, and sensor elements that depend from the circuit radially into the manifold interior to carry out collection of data. The assembly is designed to be attached to the air intake manifold of a vehicular internal combustion engine by one of several shape modes; (i) use of a flush mating flange disposed at the extreme end of the sensor assembly's manifold, (ii) push-fitting one end of the sensor assembly manifold into a complementary end of the vehicular intake manifold, stabilized by mounting ears that mate also with the intake manifold, or (iii) a hybrid of the flange or push-fit type. The internal and external diameters of the sensor assembly may also differ for different engines, and the number and spacing of fasteners openings in the differing mating flanges or mounting ears, may additionally vary.

Certain final manufacturing steps must be undertaken with respect to such sensor assemblies. For example, the sensor circuit may require laser trimming of its resistors to tune the electronics, or the circuit box may require the dispensing of viscous compounds such as epoxy, to seal the circuit chamber. Preferably these manufacturing steps are robotically carried out to increase production line speed and accurate. Repetitive robotic positioning and work must have the workpiece (here the electronic box) in the same identical work position for accuracy. To permit a work tool such as a laser trimming head or an epoxy dispensing head to be aligned with the features of the electronic box, the assembly must be accurately secured to and carried on a fixture which in turn carries reference surfaces into which the robot can key for assuring alignment with the work tool.

Unfortunately, known carrier fixture designs fail to accommodate differing assembly sizes and shapes so that the same robotically positioned work tool can accurately operate on any one of the varied shapes when the fixture moves into a work station. Existing fixtures are dedicated to essentially one sensor assembly configuration; several different sensor assemblies require several different fixture designs thereby increasing fixture costs, maintenance cost and replacement cost; there is also a greater risk that the differing fixtures can lead to slight misalignment with the trimming or dispensing tool.

SUMMARY OF THE INVENTION

It is an object of this invention to provide a single carrier fixture design that can flexibly capture and support each of a plurality of different sized and/or different shaped mass air flow sensor assemblies; it is also an object to provide a method of capturing each of differing mass air flow sensor assemblies on a single production line. The advantage of such flexible carrier fixture design and/or method is to eliminate storage of multiple use fixtures, eliminate idle time for a production line in purging the line of one type of fixture to be replaced by another and reduce potential damage or error of parts.

The invention that meets the above objects is flexible tooling fixture that accurately locates different sized and different shaped mass air flow sensor assemblies to receive treatment from a common manufacturing tool. Each assembly has a barrel with a longitudinal axis, one or more mounting brackets extending transverse to the barrel axis and a sensor module on the barrel. The fixture comprises: a pallet bed lying within an x-y plane and having reference elements for facilitating alignment of the bed to the manufacturing tool; and at least two sets of supports fixed to the top of the pallet bed, each set consisting of; (i) a flexible pivot means to accurately locate differing brackets of the sensor assemblies to maintain the axis of the barrel in a common z-x plane, the common z-x plane being off-set from the center of the bed, and (ii) one or more fixed stops for engaging the barrel and bracket of an assembly to determine a common x-y position for each sensor module with the axis of the barrel parallel to said bed, one set of supports being located to determine alignment of the axes of one class of sensor assemblies within the predetermined z-x plane when the bed is in a first predetermined position, and the other set being located to determine alignment of the axes of another class of sensor assemblies within the same predetermined z-x plane when the bed is in a second position that is 180° rotated from the first position.

BRIEF DESCRIPTION OF THE DRAWINGS

FIG. 14 is a partial side elevational view like that in FIG. 12 illustrating how an 80 mm. Flange type sensor assembly can be captured similar.

DETAILED DESCRIPTION AND BEST MODE

Figure 1:
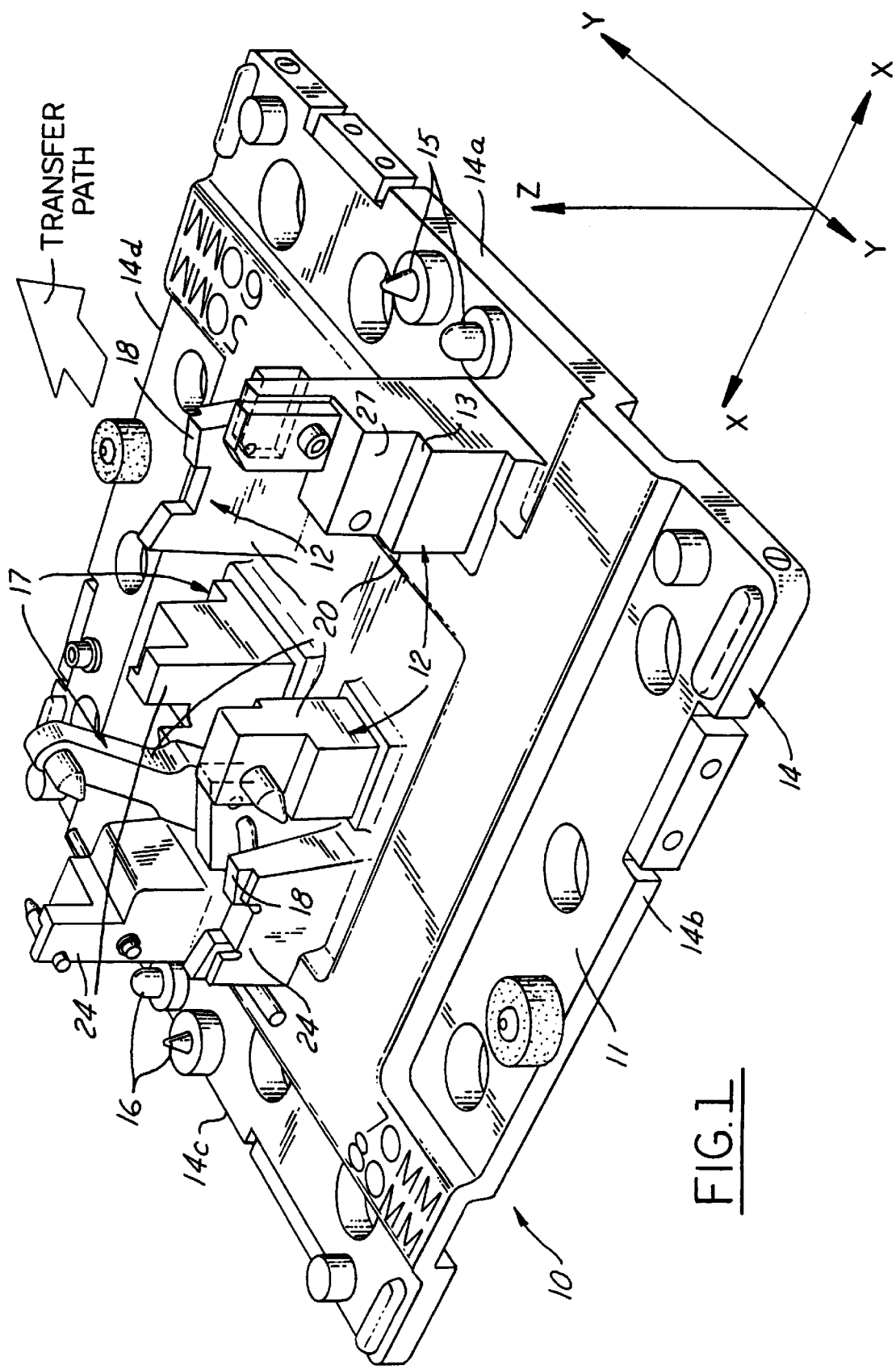
FIG. 1 is a perspective view of the carrier fixture of this invention.
Figure 2:
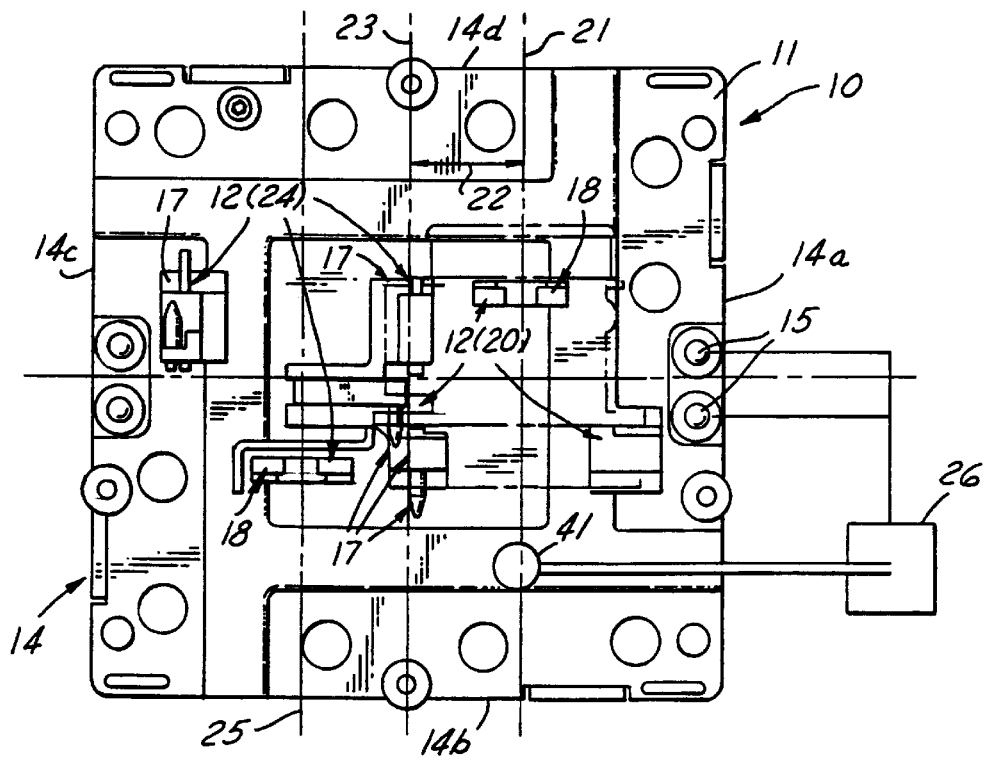
FIG. 2 is a plan view of the carrier fixture of FIG. 1 illustrating how it is used in a first position related to a manufacturing robotic work tool.
Figure 3:
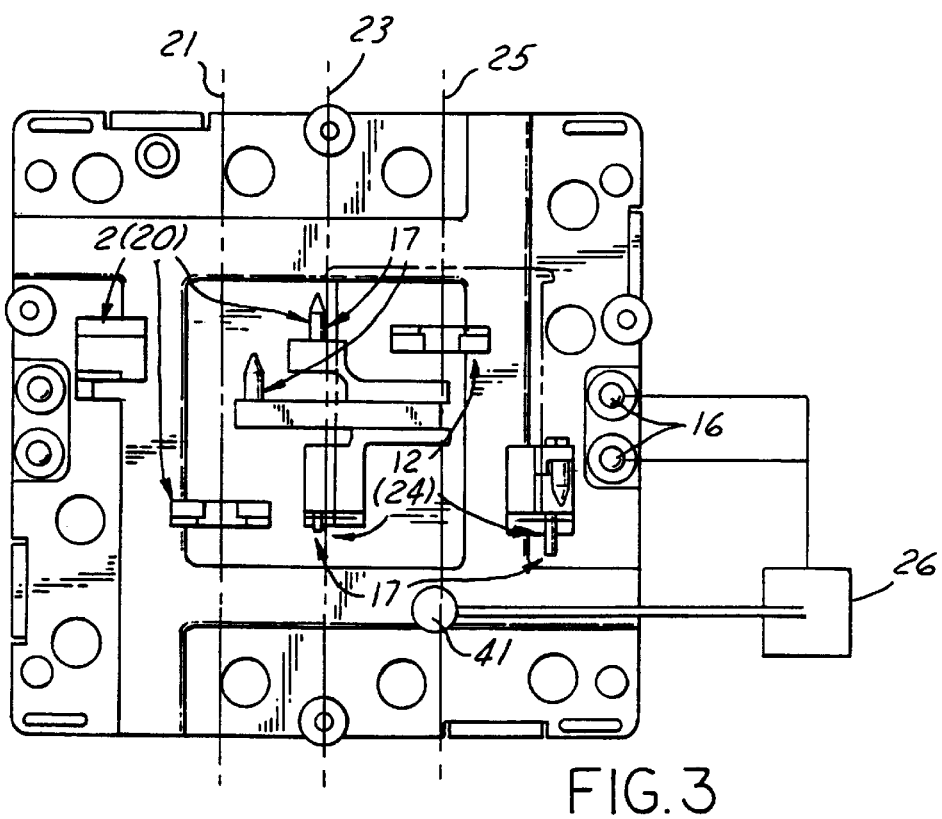
FIG. 3 is a view similar to that of FIG. 2 but illustrating the carrier fixture is used when rotated 180° in relation to the manufacturing robotic work tool.

As shown in FIGS. 1–3, the tooling fixture 10 of this invention is comprised of a pallet bed 11 preferably constituted of a rigid material such as a cast aluminum article with a plurality of integrally cast tripod type supports 12 upstanding from the top of the bed; a part of the supports are accurately machined to provide stops consisting of support surfaces 13 and shoulders 27. As shown in FIGS. 1–3, the bed 11 is generally planar to define an x-y plane and here is generally square shaped in plan view so the various sides 14 can be interchangeably guided along a transfer or conveyer path. A pair of upstanding reference elements 15, 16 are located at each side 14a and 14c for facilitating alignment of the bed to a manufacturing tool, such as a laser gun 41 or a compound dispensing gun.

There are at least two sets of supports 20 and 24, each set consisting of a pivot means 17 and one or two fixed stops 18 to complete the tripod support. The pivot means 17 accurately locates differing sized and differing shaped mass air flow sensor assemblies 30 so that the axis 28 of each such assembly will lay in the same Z-X reference plane, relative to the x-y plane of the pallet bed. The fixed stops cooperate in establishing that the assembly axis 28 when in such Z-X plane will be parallel to the x-y plane of the pallet bed and will locate the sensor module at the same identical x-y location.

One set of supports 20 is arranged to support a first class of sensor assemblies so that they can have their axes aligned in the z-x plane 21, offset a predetermined distance 22 from one of the planar axes 23 of the pallet bed when reference elements 15 are mated to the manufacturing tool 26 (as shown in FIG. 2). A second set of support 24 is located at the other side of axis 23 to support a second class of sensor assemblies so that the second class can have their axes aligned in a z-x plane 25 which becomes coincident with the z-x plane 21 when the bed is rotated 180° so that reference elements 16 can instead be mated to the manufacturing tool 26 (see FIG. 3).

Figure 4:
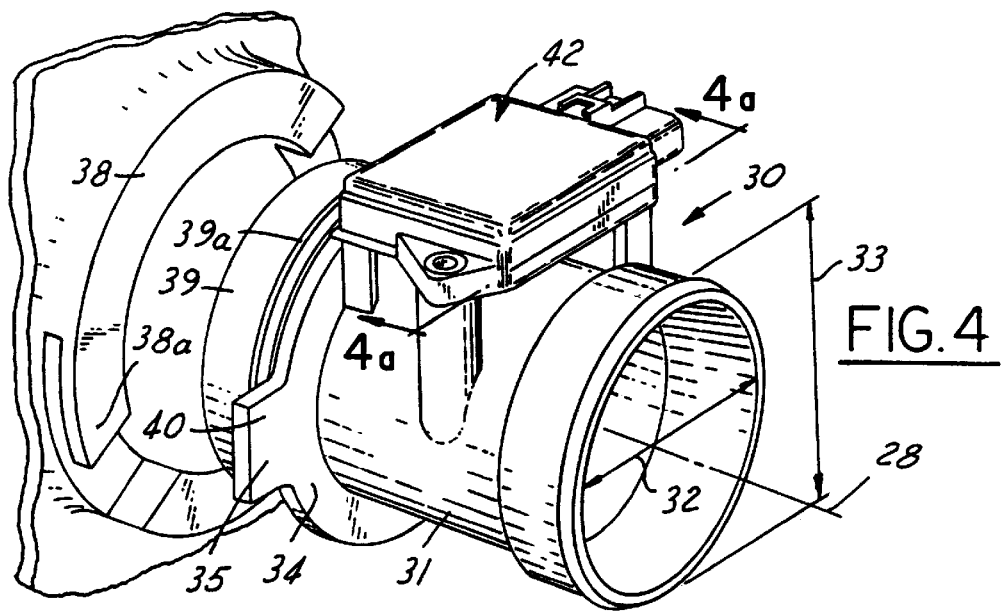
FIG. 4 is a perspective view of one size and one shaped sensor assembly illustrating in outline how it is attached to an engine air intake manifold.

Referring to FIG. 4, the mass air flow sensor assembly 30 is comprised of a metal or plastic barrel body 31 forming a sensing manifold and can vary in diametrical size. For example the internal diameter 32 or the external diameter 33 of the barrel body 31 typically can be as little as 40–50 mm and as great as 80–90 mm. The sensor assembly has one or more mounting brackets 34 extending transverse to the barrel longitudinal axis 28; the mounting bracket 34 can vary in shape and in the manner in which bracket ears are shaped or provided with fastener openings 35 spaced in such bracket. The push-fit type of mounting bracket shown in FIG. 4, has barrel 31 provided with an end 39 adapted to extend snugly into the interior of an engine air intake manifold 38; end 39 also has an annular groove 39a carrying a ring seal for promoting a push fit sealing function. Bracket ears 40 extend radially outwardly from end 39 at a middle station of the barrel 31 to provide for final securement of the barrel to complementary shaped intake manifold bracket slots 38a.

Figure 5:
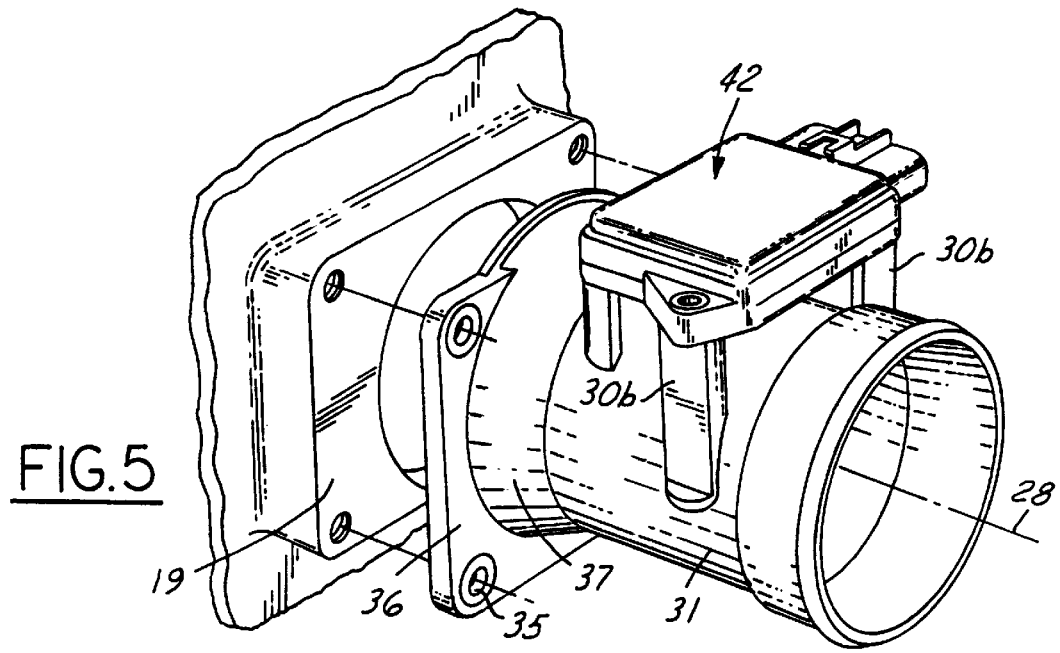
FIG. 5 is a perspective view of another type of sensor assembly illustrating how it is attached to an engine air intake manifold.

A full flange mounted sensor body has a shape as shown in FIG. 5; the flange 36 extends completely around and extends traverse to the end 37 of the barrel 31. Four fastener openings 35 are spaced at the quantrants of the flange for permitting fasteners to extend therethrough and mate with similar openings in a bracket mount 19 of a complementary air intake of an engine.

Figure 4A:
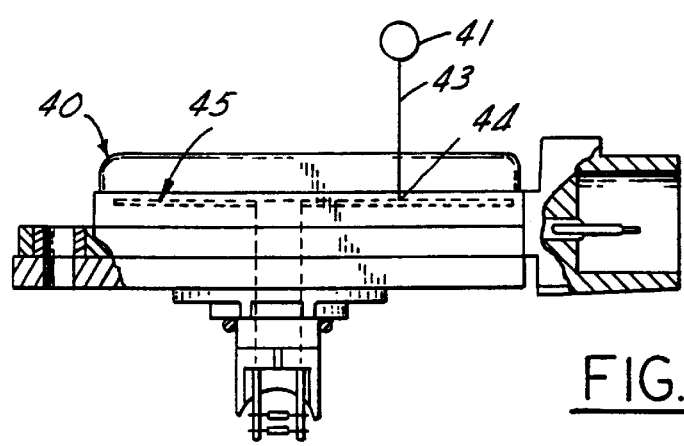
FIG. 4a is an enlarged sectional view of the sensor module of FIG. 4 taken substantially along line 4a—4a thereof and illustrating how a laser gun can be employed to carry out trimming of electronic circuit elements of the sensor.

Precise alignment of all the barrel axes of the different sensor assemblies in a common z-x plane coupled with location of the sensor module in the same x-y position, is essential to carrying out accurate manufacturing steps, such as laser trimming for temperature compensation of the circuit, or carrying out dispensing of the sealants to seal the sensor module or circuit box 42. The sensor assembly manifold is made to accurately locate and support the sensor module relative to the barrel axis 28a and in a fixed relation to the mounting bracket, by pedestals 30b. Laser trimming demands an extremely high degree of dimensional accuracy aligning a very narrow laser beam 43 with a finite area 44 of one of the resistors of the printed circuit 45 (see FIG. 4a). Without a stable accurate plane that contains the different sensor assembly axes and stopping the sensor module on the different assemblies in an exact x-y position, accurate positioning of the various assemblies to a laser gun 41, such trimming could not be accurately achieved or repeated.

Figure 6:
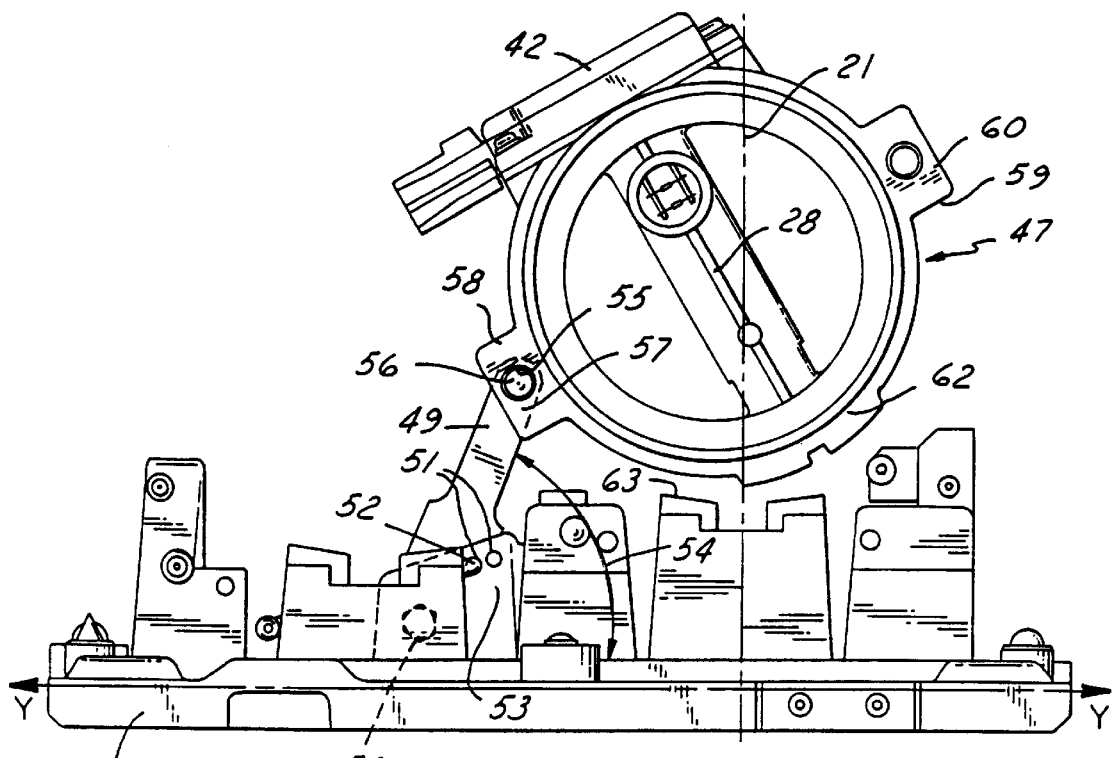
FIG. 6 is an enlarged front elevational view of the carrier fixture illustrating how one set of supports can be used to capture and support a 60 mm. push-fit type of mass air flow sensor assembly, the assembly being shown in a first position on a pivot dowel for rotation into proper support engagement.
Figure 7:
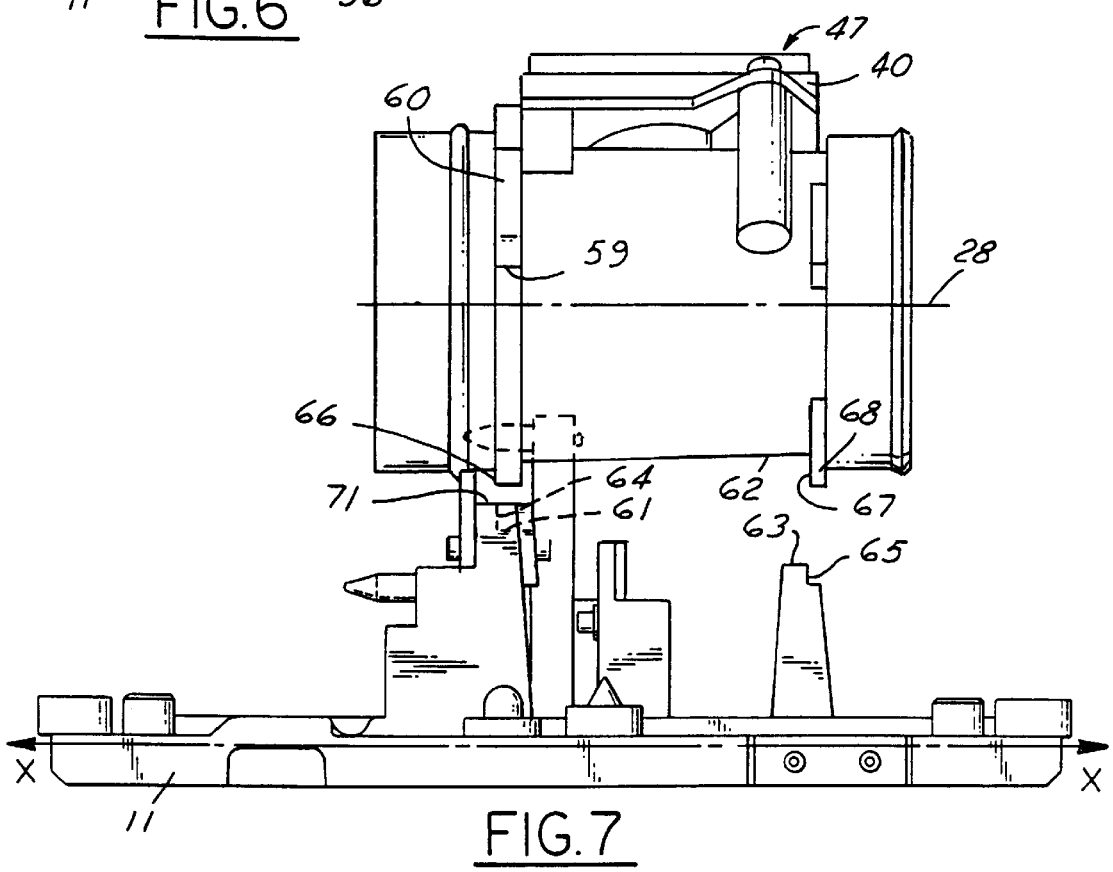
FIG. 7 is a side elevational view of the structure in FIG. 6.

After the fixture bed 11 is connected to the manufacturing tool 26 as indicated above in FIG. 2, the fixture bed is oriented to receive one of a class of sensor assemblies. Support set 20 can, for example, accommodate a class of supports of different sensor assembly bodies which may include (i) a plastic barrel 46 with a 50 mm internal barrel diameter and having a push-fit mounting bracket, (ii) a plastic barrel 47 with a 60 mm internal diameter and having a push-fit mounting bracket and (iii) an aluminum barrel 48 with a 60 mm internal diameter having a flange mount bracket. FIGS. 6–7 illustrate how set 20 first accommodates barrel 47. An arm 49, pivotal about axis 56, has 2 or more openings 51 adapted to receive a retractable pin 52 carried by boss 53, to permit the angle 54 of the arm, relative to the bed, to be indexed. In FIG. 6, arm 49 is indexed to the higher position to receive barrel 47 that has a 60 mm push-fit body. One bracket ear 58 has an opening 55 hung on a dowel 56 for pivoting the assembly. The dowel 56 is carried by the upper end 57 of the arm; the pivoting achieves a predetermined geometrical position to receive mounting ear 58 at its fastener opening 55 and allow the barrel 47 to be swung down about the dowel 56 causing the bottom edge 59 of the other mounting ear 60 to engage a precisely positioned stop 61 and simultaneously engage end region 62 of the barrel bottom to engage arcuate pedestal stop 63. The combination of bracket ear 58 being secured on the dowel 56, and ear 60 engaging stop 61 and barrel region 62 engaging stop 63, create a tripod effect. As shown in FIG. 7, the assembly is captured on such supports by virtue of the use of upright shoulder 64 adjacent stop 61 and shoulder 65 adjacent stop 63 which respectively engage transverse planer surface 66 of the mounting ear 60 and transverse planer surface 67 of a radially extending rib 68 on the barrel region 62. The barrel axis 28 is now supported parallel to the x-y plane within the z-x plane 21 within an accuracy of at least 0.020 inches.

Figure 8:
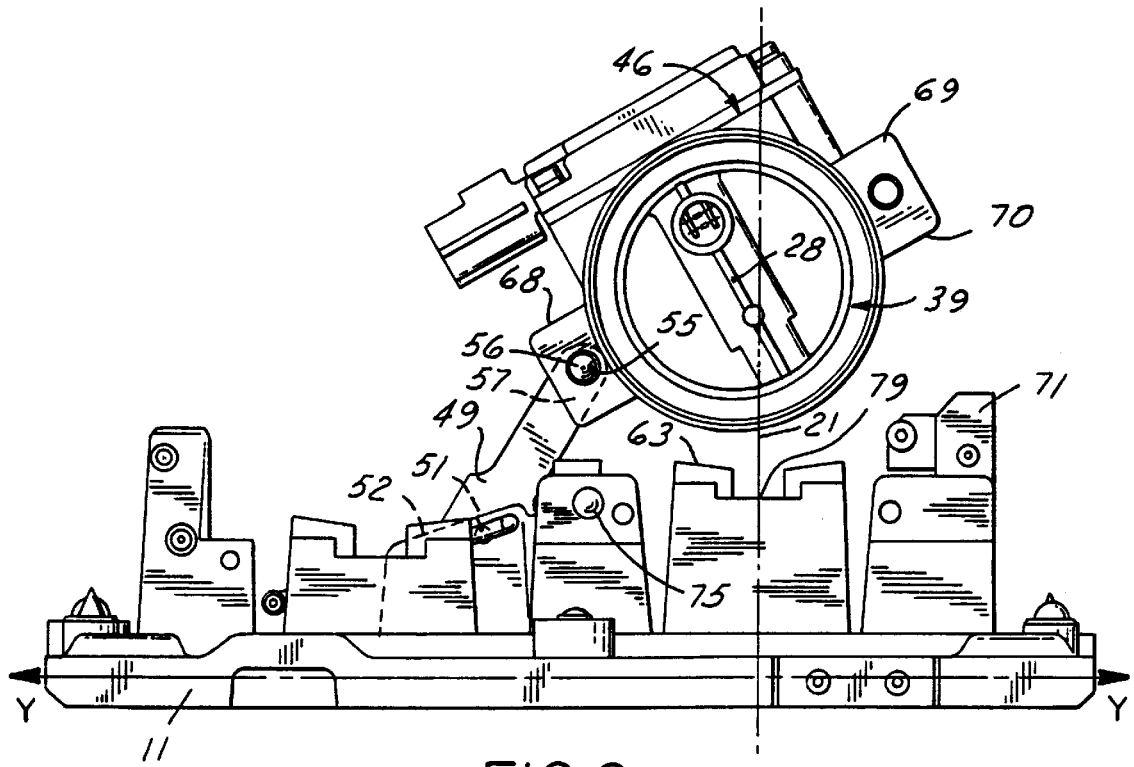
FIG. 8 is a view similar to that of FIG. 6 showing the carrier fixture in a different position with a pivotal arm indexed to a new position for flexibly accommodating a 50 mm push-fit type sensor assembly.

As shown in FIG. 8, the 50 mm push-fit style body 46 can be mounted on the same support set 20, in lieu of body 47, by slightly lowering the angle of arm 49 (removing and reinserting the pin 52 with a different receiving opening 51 of the arm) to a position mounting ear 68 at a lower angle 54 for dowel 56; the other mounting ear 69 will have its bottom edge 70 contact a different (slightly lower) stop 71 aligned with the newly positioned dowel 51. This allows the bottom of the barrel to simultaneously engage the same pedestal stop 63, again assuring a tripod support with the barrel axis parallel to the bed plane x-y and within the z-x plane 21, but at a slightly different z elevation. Different adjacent shoulders are at stops 71 to capture the assembly in the supported condition.

Figure 9:
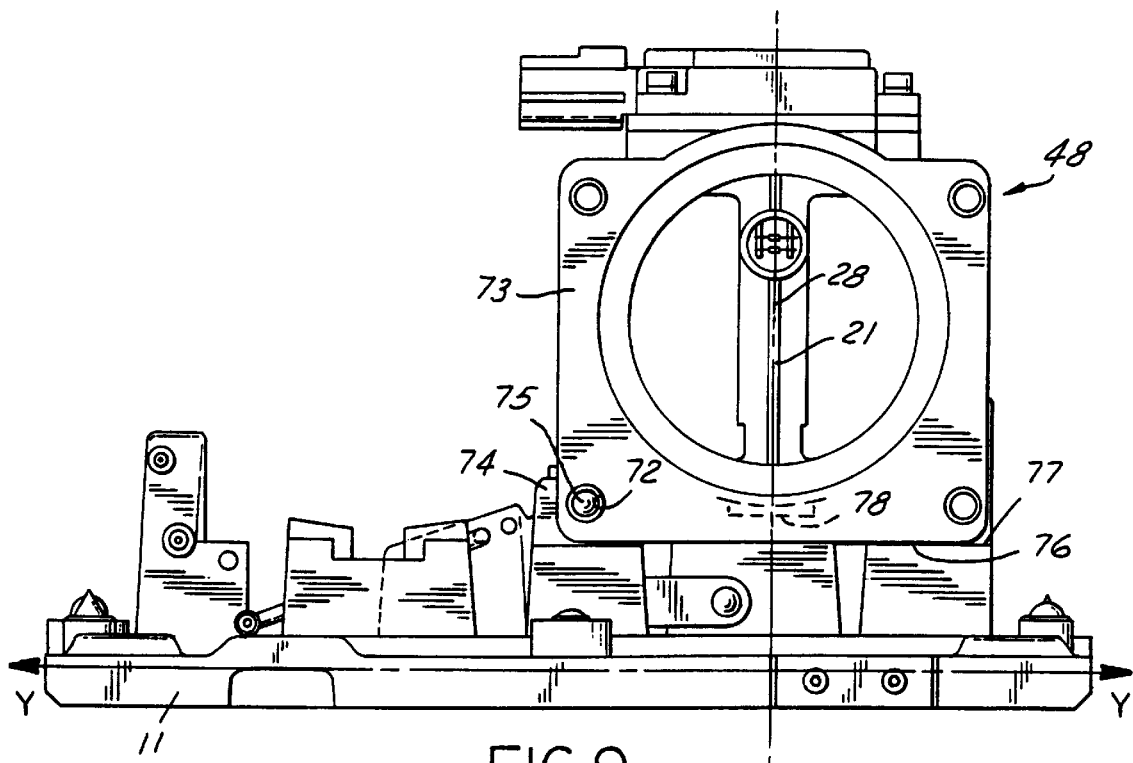
FIG. 9 is a view similar to that of FIGS. 6 and 8, but illustrating how the carrier fixture can receive a 60 mm. flange type sensor assembly utilizing a different pivot dowel.

As shown in FIG. 9, the 60 mm full flange-fit body 48 can be rotated into a locked secured and captured tripod position, by impaling corner opening 72 of the flange 73 on dowel 75 which is fixedly stationed on boss 74; dowel 75 is at a lower level than either of the previous stations of dowel 56. The barrel 48 is pivoted about dowel 75 and swung down to (a) engage the bottom edge 76 of the other corner of flange 73 with stop 77, and (b) engage the bottom of rear flange 78 of the barrel with the pedestal stop 79. Once again, the axis of the 60 mm body 48 is aligned parallel to the bed plane and within the z-x plane 21.

Figure 10:
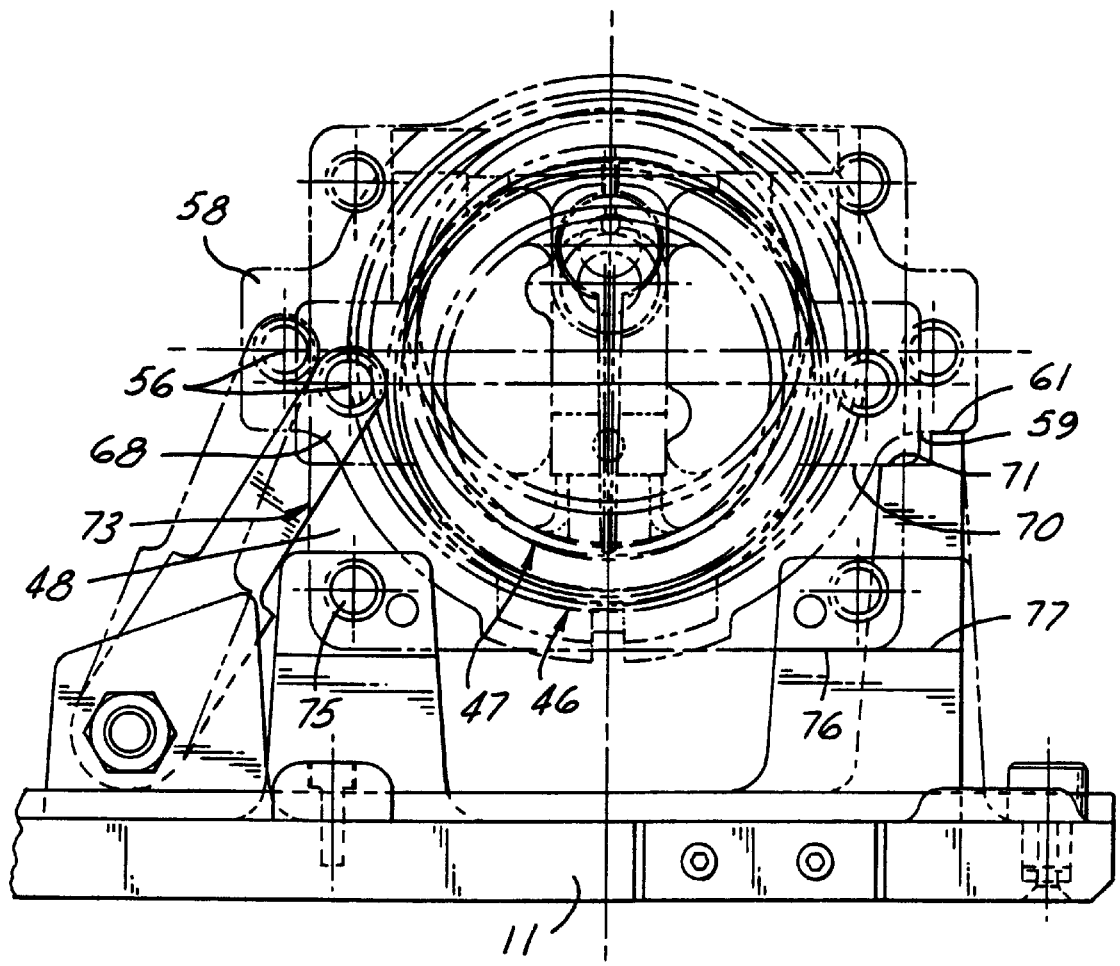
FIG. 10 is a front elevational view of the carrier fixture as in the position of FIG. 6 but illustrating the outlines of the several different sensor assemblies of FIGS. 6, 8 & 9 super imposed in their supported position.

FIG. 10 shows, in outline, the different barrels 46, 47, 48 and their axes, all superimposed to illustrate the continuity of maintaining the axes of different sized and different shaped sensor assemblies within the z-x plane. It shows how the axes 28 of the different shaped barrels 46, 47, and 48 all and parallel to the x-y plane are locked in the same z-x plane 21 and parallel to the x-y plane when captured by the supports 20 of the fixture. The axes will not necessarily be at the same z height as is evident from FIG. 10; this results from the different barrel diameters and different elevational bracket positions when on the supports. Moreover, the sensor module for each different shape is in the same exact x-y position (the sensor module can all be identical in configuration based on its known relation to the differing mounting brackets.

Figure 11A:
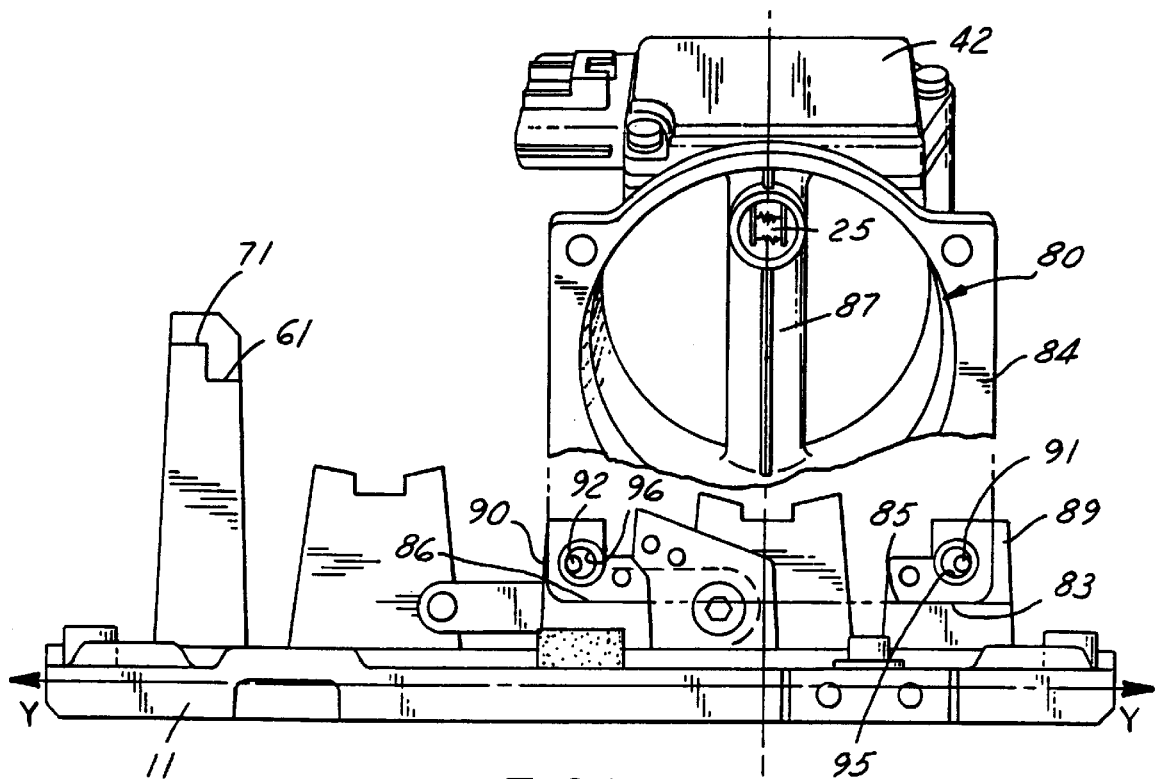
FIG. 11a is a side elevational view of the structure as FIG. 11 taken along line 11a—11a thereof.
Figure 11:
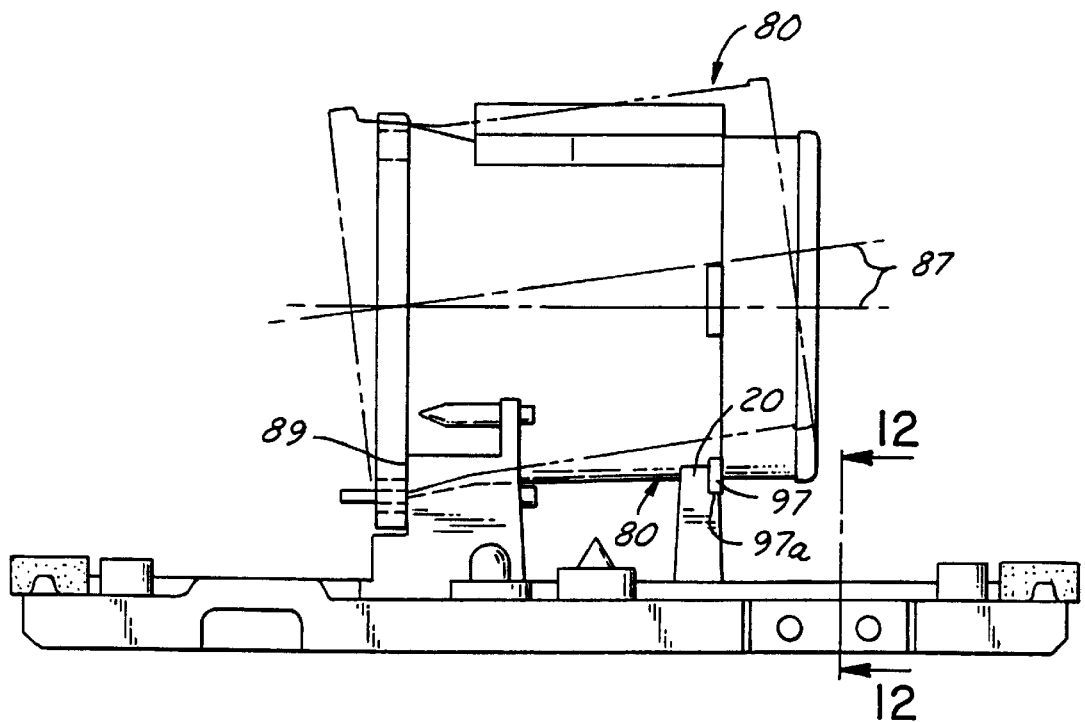
FIG. 11 is a side elevational view of the carrier fixture of this invention illustrating how a different set of supports can be deployed to capture yet still another class of sensor assemblies when the fixture is rotated 180° as in FIG. 3; here a 70 mm flange type sensor assembly is shown as being brought into engagement with a pair of pins so as to be ready to be rotated for engagement with the other support.

FIGS. 11, 11a, 12–14 illustrate how the other set of supports 24 can flexibly support another class of assemblies which posses even more differently sized bodies (i.e. a 70 mm full flange-fit plastic barrel body 80, a 70 mm universal flange-fit body 81, and an 80 mm full flange-fit plastic body 82) provided the pallet 11 is rotated 180° relative to the transfer path and manufacturing tool. FIGS. 11 and 11a illustrate how the body 80 is mounted on the pallet bed; the bottom 83 of flange 84 is tilted to engage a pair of equal-height horizontally-flat stops 85, 86 while the axis 87 of the body is angled with respect to the bed plane x-y. The flange 84, in its skewed position, is pushed toward the upright planer shoulders 89, 90, while pins 91, 92 (extending horizontally outwardly from shoulders 89, 90), receive the openings 95, 96 of the flange 84. The pins tangentially engage the outer sides (relative to axis 87) of the openings. The pins 91, 92 each have a diameter that is ⅕ to ⅒ the diameter of the openings 95, 96. This aligns the axis 87 of the body within the z-x plane 25 accurately and the tangential engagement captures the body. Once the pins are received in such openings, the longitudinal axis 87 of the body is pivotally lowered (as shown in FIG. 11) flange 84 rests on stops 85, 86; this results in engagement of the bottom 97a of the barrel flange 97 with a pedestal surface 98 and the axis thereby becomes parallel to the x-y plane (see FIG. 12).

Figure 13:
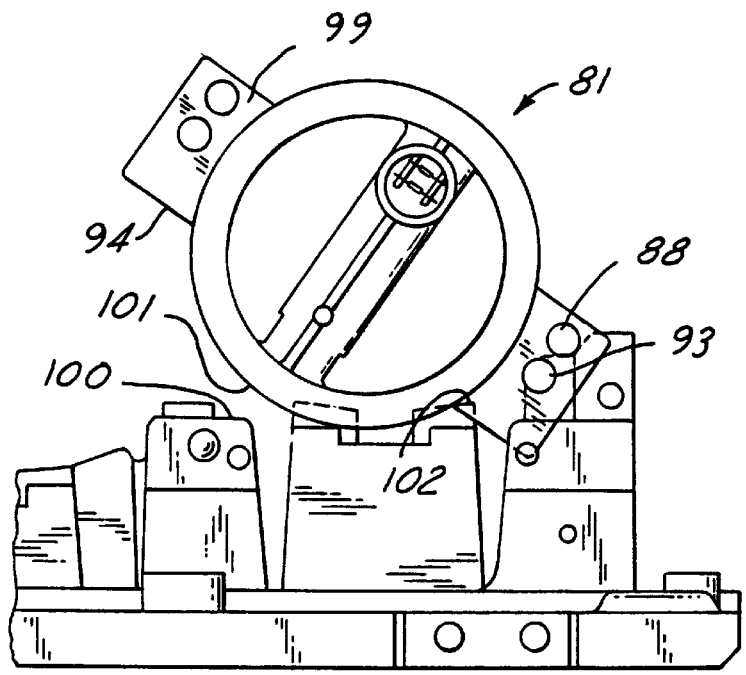
FIG. 13 is a partial elevational view like that in FIG. 11, illustrating how a 70 mm universal-fit type of sensor assembly can be receiving for rotation and thence capture by the fixture.

As shown in FIG. 13, the 70 mm body 81 is mounted similar to the manner described in connection with FIGS. 6–10. A right hand mounting ear 88 is hung on dowel pin 93 and the body rotated to engage the bottom 94 of the other mounting ear 99 with stop 100 while the bottom 101 of the barrel engages pedestal stop 102.

Figure 12:
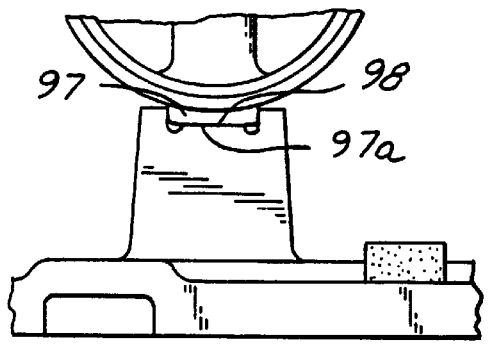
FIG. 12 is a partial rear elevational view of the carrier fixture of FIG. 11 taken along line 12—12 thereof.
Figure 14:
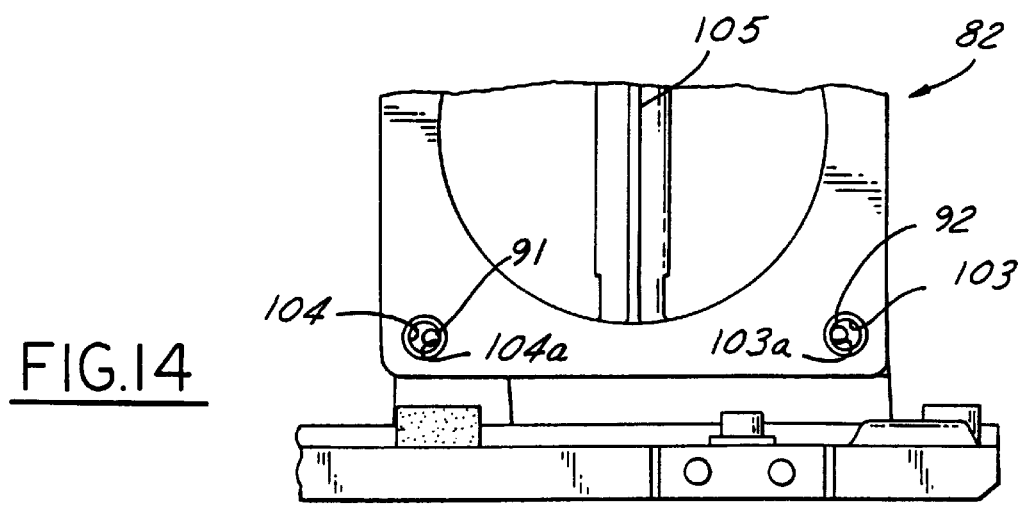

As shown in FIG. 14, the 80 mm body 82 is mounted on the pallet similar to body 80 of FIGS. 11a and 11–12; the same pins 91, 92 are utilized, but tangentially engage the inner radial sides 103a and 104a of the bracket openings 103 and 104. The longitudinal axis 105 is maintained cocked when engaging the pins in the openings 103 and 104, like in the position of FIG. 11.

A hard low friction coating can be applied to the support and engagement surfaces to improve transport capability. Very high volume of many different sized and shaped bodies can now be operated upon along the same production manufacturing line. The sensor assembly not only accurately supports but secures or captures by virtue of the various counter-acting stops and shoulder surfaces.

While particular embodiments of the invention have been illustrated and described, it will be obvious to those skilled; in the art that various changes and modifications may be made without departing from the invention, and it is intended to cover in the appended claims all such modifications and equivalents as fall within the true spirit and scope of this invention.

We claim:

1. A flexible tooling fixture for accurately locating different sized and different shaped mass air flow sensor assemblies so as to receive treatment from a common robotically positioned manufacturing tool, each assembly having a barrel with a longitudinal axis, one or more mounting brackets extending transversely to the barrel axis and a sensor module on the barrel, the fixture comprising:

(a) a pallet bed lying within an x-y plane and having reference elements for alignment of the bed to said manufacturing tool; and (b) at least two sets of supports extending from the top of said pallet bed, each set consisting of (i) a flexible pivot means to accurately locate differing brackets of said sensor assemblies to maintain the axis of each barrel in a common z-x plane, said z-x plane being off-set from the center of said bed, (ii) one or more fixed stops for engaging the barrel and bracket of each assembly to determine a common x-y position for each sensor module with the axis of the barrel in a predetermined relation to said bed, one set of supports being located to determine alignment of the axes of one class of sensor assemblies within the predetermined z-x plane when said bed is in a first predetermined position, and the other set being located to determine alignment of the axes of another class of sensor assemblies within the same predetermined z-x plane when said bed is in a second position rotated 180° from the first position.

2. The tooling fixture as in claim 1, in which, in sub-element (b) (ii), said fixed stops determine an x-y position for each sensor module when the axis of the barrel is parallel to said bed.

3. The tooling fixture as in claim 1, in which said reference elements comprise a pair of closely spaced self-centering cylindrical reference surfaces.

4. The tooling fixture as in claim 1, in which said pivot means comprises a dowel carried on an accurately adjustable arm for one set of said supports, said dowel journaling one portion of a bracket for an assembly so that it can be rotated to carry the barrel axis into said z-x plane.

5. The tooling fixture as in claim 1, in which said pivot means comprises a pair of stop surfaces cooperating with predetermined spaced pins fixedly adjacent said stop surfaces, said pins being effective to tangentially engage the sides of a pair of spaced openings in said mounting bracket for capturing the assembly while controlling pivotal movement of the assembly axis about said pair of stop surfaces to carry the barrel axis into said z-x plane.

6. The tooling fixture as in claim 5 in which said spaced pins tangentially engage either the most adjacent or the most remote sides of said pair of bracket openings for capturing the assembly.

7. The tooling fixture as in claim 1 in which said two sets of stops overlap a central axis of said pallet bed.

8. The tooling fixture as in claim 1 in which each of said two sets of supports possess both stop surfaces parallel to the x-y plane, and also upright shoulder surfaces facilitating capture of the assembly.

9. The tooling fixture as in claim 8 in which at least some of said upright shoulder surfaces act opposite to other upright shoulder surfaces to assure capture.

10. The tooling fixture as in claim 1 in which said reference elements align said bed to a laser trimming tool for electronically tuning said sensor module of each assembly.

* * * * *